US011933248B1

(12) United States Patent
Krzywon

(10) Patent No.: US 11,933,248 B1
(45) Date of Patent: Mar. 19, 2024

(54) REVERSE THRUST SYSTEM AND METHOD

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/063,814

(22) Filed: Dec. 9, 2022

(51) Int. Cl.
*F02K 1/76* (2006.01)
*F02K 1/60* (2006.01)
*F02K 1/66* (2006.01)
*F02K 1/70* (2006.01)

(52) U.S. Cl.
CPC ............... *F02K 1/766* (2013.01); *F02K 1/60* (2013.01); *F02K 1/66* (2013.01); *F02K 1/70* (2013.01); *F02K 1/76* (2013.01); *F05D 2220/323* (2013.01); *F05D 2270/051* (2013.01)

(58) Field of Classification Search
CPC ............. F02K 1/76; F02K 1/763; F02K 1/766
See application file for complete search history.

(56) References Cited

U.S. PATENT DOCUMENTS

| 5,493,856 A * | 2/1996 | Newton ............ F02K 1/76 60/39.091 |
| 10,343,786 B2 | 7/2019 | Nestico et al. |
| 10,443,540 B2 | 10/2019 | Marcos |
| 11,414,175 B2 | 8/2022 | Zingaro et al. |
| 2016/0102633 A1* | 4/2016 | Joret ......................... F02K 1/72 239/265.19 |
| 2017/0292474 A1* | 10/2017 | Davies .................... F02K 1/625 |
| 2019/0002118 A1* | 1/2019 | Nestico .................. F02K 1/763 |
| 2020/0332742 A1* | 10/2020 | Goudard ................. F02K 1/763 |

FOREIGN PATENT DOCUMENTS

WO    2021054861    3/2021

* cited by examiner

*Primary Examiner* — Andrew H Nguyen
(74) *Attorney, Agent, or Firm* — NORTON ROSE FULBRIGHT CANADA LLP

(57) ABSTRACT

A method of operating a reverse thrust system of an aircraft engine, the method comprising: receiving a status signal indicative that the aircraft is on-ground or in-flight; and upon detecting that the aircraft is on-ground, overriding a protection module such that the reverse thrust system is operable regardless of the protection module being in an active state or in a disabled state, the protection module causing, absent the overriding, the reverse thrust system to be inoperable when in the active state. An aircraft comprising: an engine including a reverse thrust system; a thrust control input device configured for generating an input signal indicative of a reverse thrust demand; at least one sensor configured for generating at least one status signal indicative of the aircraft being in-flight or on-ground; and a control system electronically connected with the at least one sensor, the thrust control input device and the reverse thrust system.

10 Claims, 4 Drawing Sheets

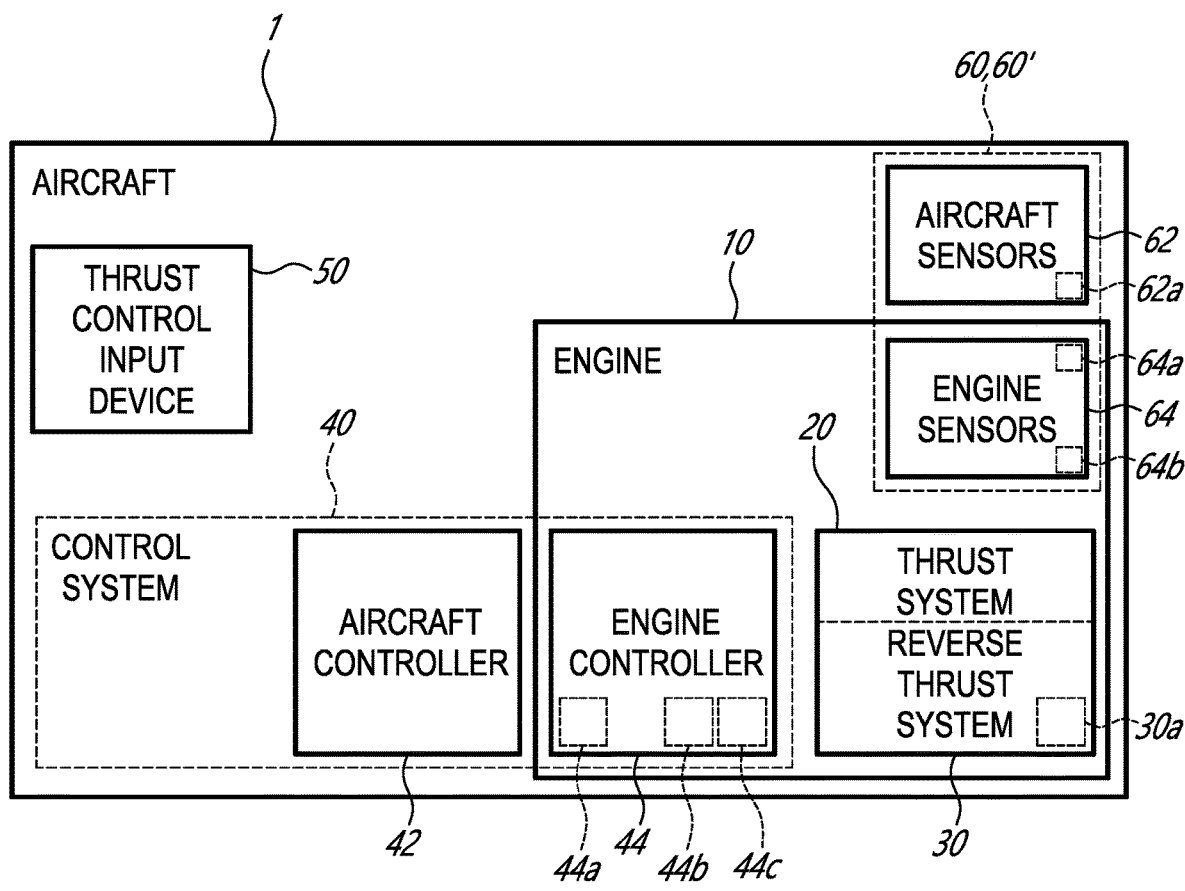

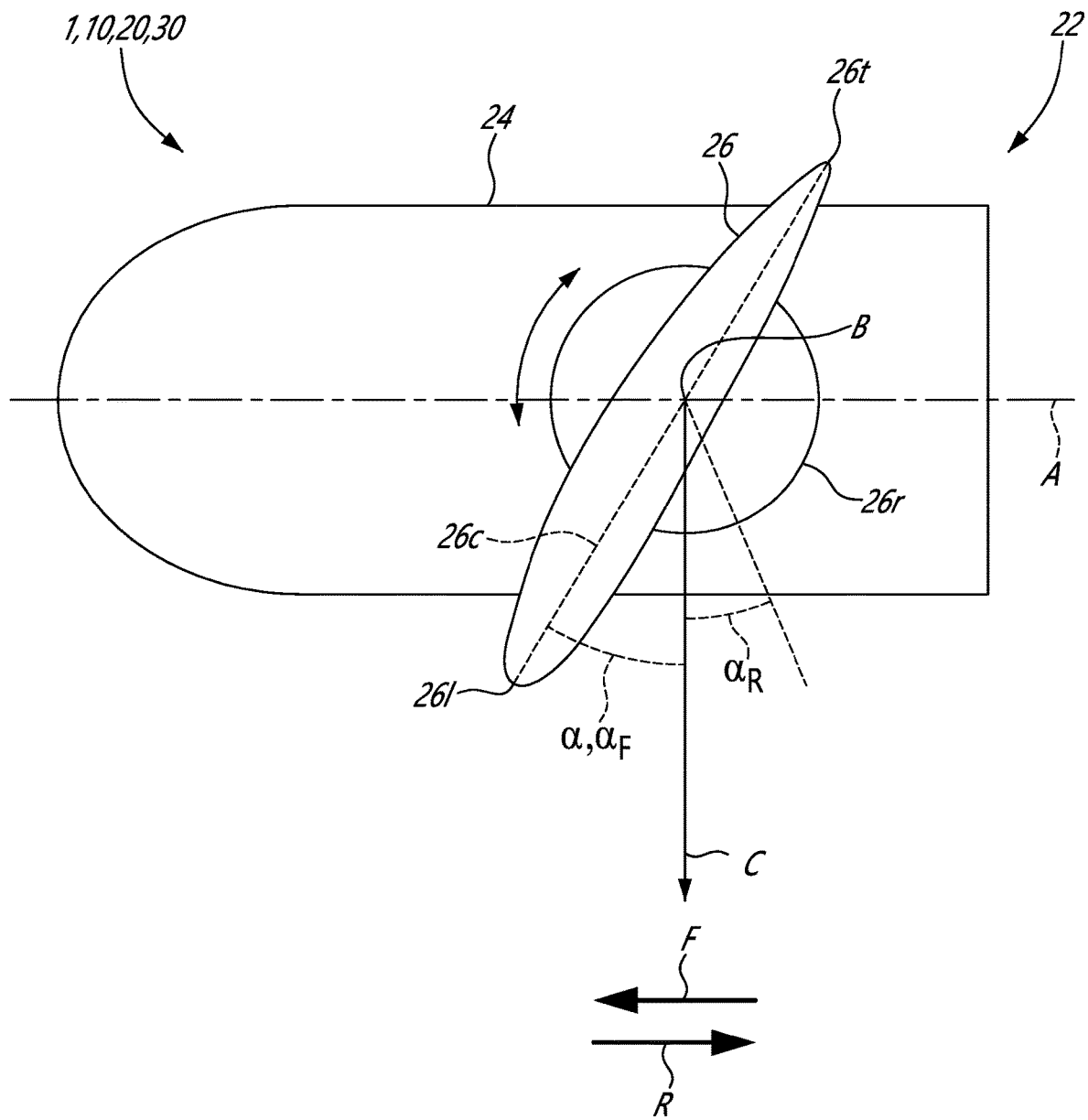

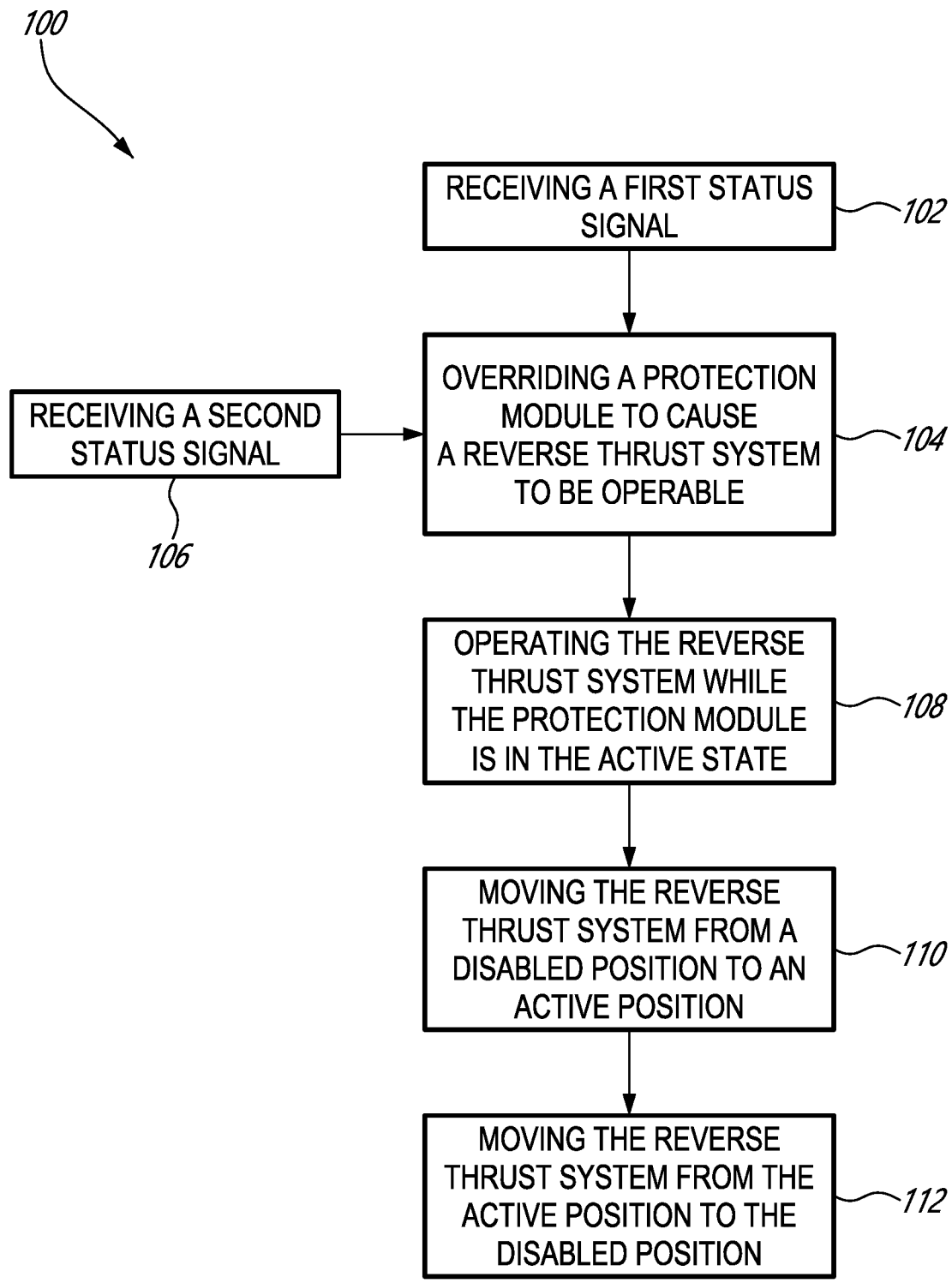

REVERSE THRUST SYSTEM AND METHOD

TECHNICAL FIELD

The disclosure relates generally to aircraft having engines capable of thrust reversal and, more particularly, to methods of operating a reverse thrust system of an aircraft engine.

BACKGROUND

Thrust reversal is used on some aircraft to selectively direct the thrust produced by one or more engines of the aircraft in the forward direction so as to either act against forward travel of the aircraft or in some cases to induce backward travel, i.e., powerback. When used during landing manoeuvers, usage of such reverse thrust may for example reduce wear on aircraft brakes and/or shorten landing distances. However, the application of reverse thrust requires careful pilot coordination depending on the manoeuver being undertaken, and safely measures are required to prevent inadvertent implementation of thrust reversal during flight.

SUMMARY

According to an aspect of the present technology, there is provided a method of operating a reverse thrust system of an engine in an aircraft, the method comprising: receiving a status signal indicative that the aircraft is on-ground or in-flight; and upon detecting that the aircraft is on-ground based on the status signal, overriding a protection module such that the reverse thrust system is operable regardless of the protection module being in an active state or in a disabled state, the protection module causing, absent the overriding, the reverse thrust system to be inoperable when in the active state.

In another aspect of the present technology, there is provided an aircraft comprising: an engine including a reverse thrust system; a thrust control input device configured for generating an input signal indicative of a reverse thrust demand; at least one sensor configured for generating at least one status signal indicative of the aircraft being in-flight or on-ground; and a control system electronically connected with the sensor, the thrust control input device and the reverse thrust system, the control system configured to control the reverse thrust system for operation of the reverse thrust system according to the input signal when the control system is in a disabled state or when the control system is in an active state and a signal of the at least one status signal is indicative of the aircraft being on-ground, the control system configured to prevent operation of the reverse thrust system upon the control system being in the active state absent any of the at least one status signal being indicative that the aircraft is on-ground.

BRIEF DESCRIPTION OF THE DRAWINGS

Reference is now made to the accompanying figures in which:

FIG. 1 is a schematic view of an aircraft;

FIG. 2 is an elevation view of an aircraft engine having a propeller;

FIG. 4 is a flow chart showing a method of operating a reverse thrust system of an aircraft engine.

DETAILED DESCRIPTION

Figure 3A:
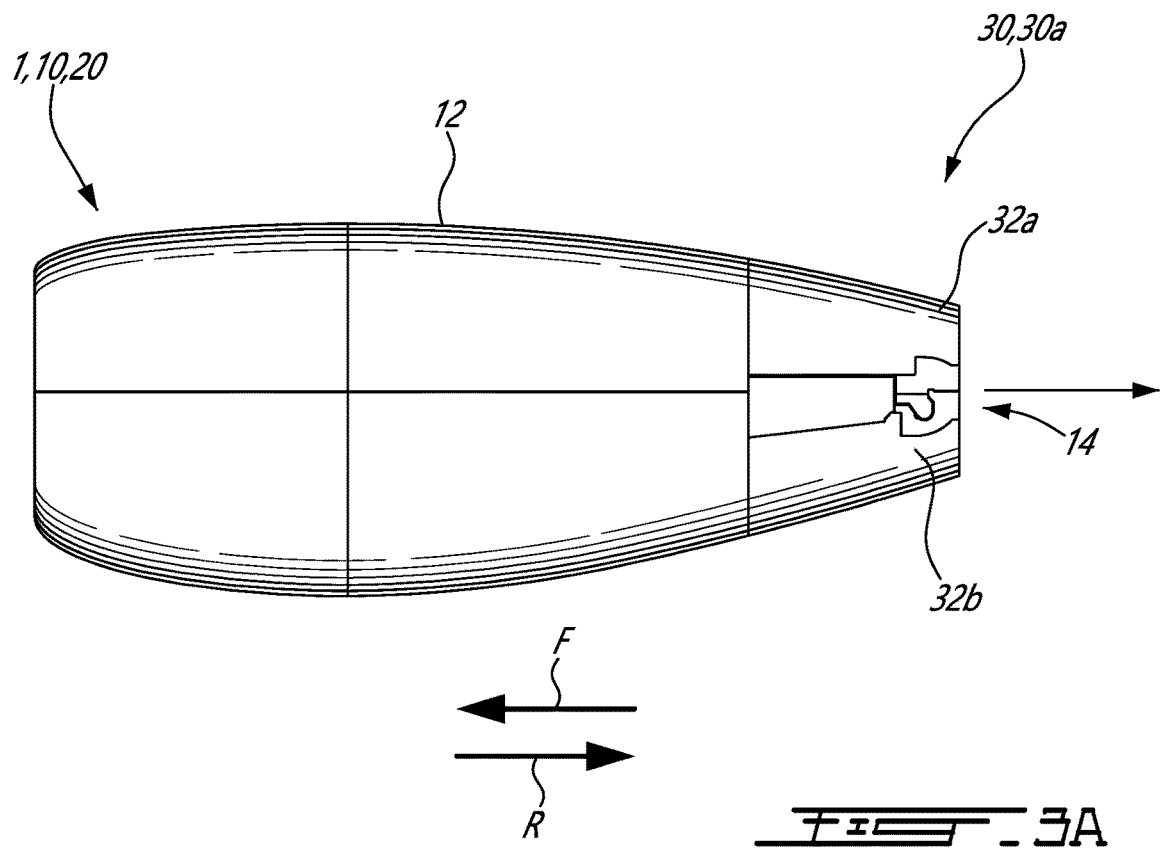
FIG. 3A is an elevation view of an aircraft engine having a thrust reverser, the thrust reverser shown in a stowed position.
Figure 3B:
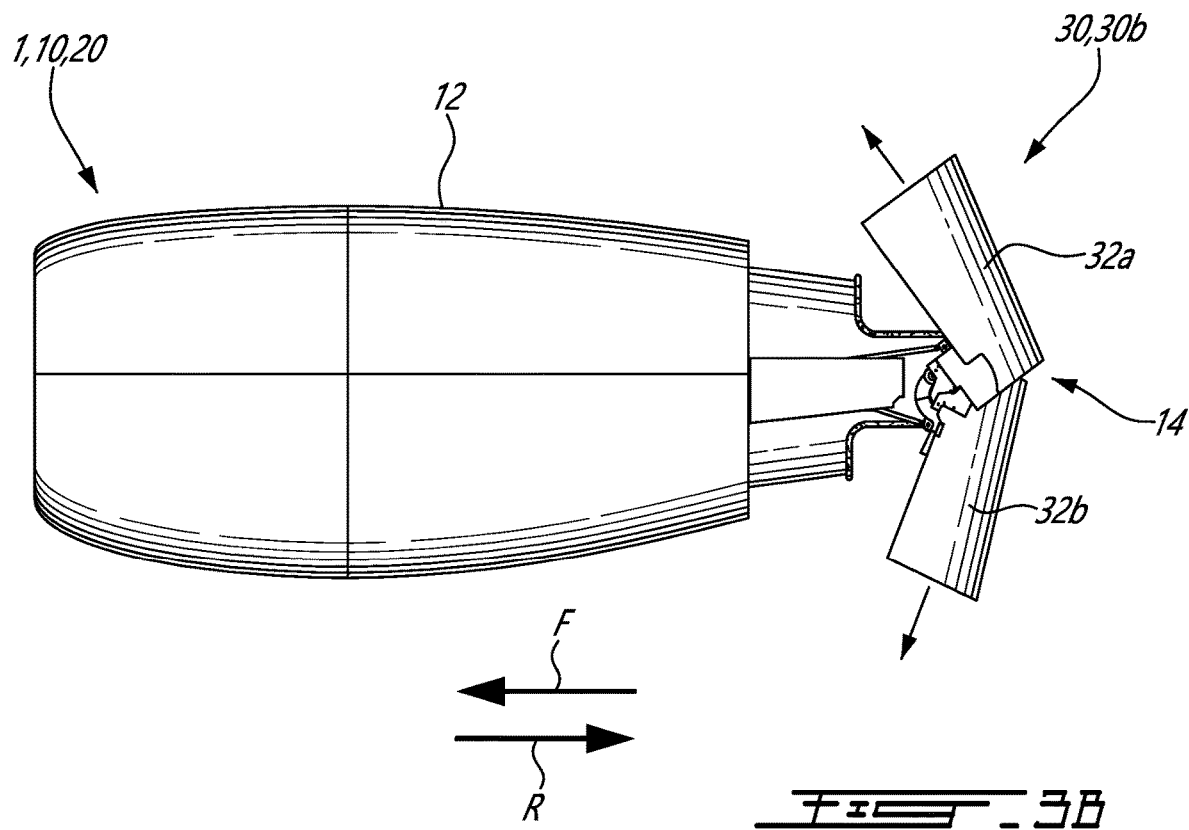
FIG. 3B is an elevation view of the aircraft engine of FIG. 3A, the thrust reverser shown in a deployed position.

In accordance with an aspect of the present technology, FIG. 1 schematically illustrates an aircraft 1 comprising an aircraft engine 10 of a type preferably provided for use in subsonic flight and capable of producing thrust (i.e., an acceleration of fluid mass in a generally rearward direction relative to the aircraft 1 for causing the aircraft 1 to accelerate in an opposite, forward direction) and reverse thrust (i.e., an acceleration of fluid mass generally in the forward direction to cause the aircraft 1 to decelerate in the forward direction or to accelerate in the rearward direction) respectively via a thrust system 20 and a reverse thrust system 30 of the engine 10. The forward and rearward directions F, R are schematically shown in FIGS. 2, 3A and 3B. Still referring to FIG. 1, the aircraft 1 also comprises a control system 40 electronically coupled to the engine 10 for controlling its operation, including production of thrust and/or reverse thrust. "Electronically coupled" refers to the presence of suitable wired or wireless connection between electronic components of the aircraft 1 for interaction (whether unilateral or bilateral) therebetween.

The control system 40 may include one or more controllers 42, 44 that may be provided at separate locations of the aircraft 1. For instance, aircraft controller(s) 42, or avionics controller(s), which may include a flight management computer and a flight control computer, may be located inside or near a cabin of the aircraft 1. Engine controller(s) 44, for example an electronic engine controller (EEC) which may be a full authority digital engine controller (FADEC), may be located onboard the engine 10. The aircraft 1 also comprises a thrust control input device 50, typically provided in the form of one or more thrust levers (or power levers), that is electronically coupled to the engine 10 via the control system 40. The thrust control input device 50 can be used to selectively, at least under certain circumstances, send an input signal (such as a signal indicative of a Power Lever Angle (PLA)) to the engine 10 to demand the production of thrust or reverse thrust. Also provided on the aircraft 1 are sensors 60 capable of monitoring aircraft system(s). The sensors 60 that are capable of generating signals indicative of aircraft position, aircraft flight status (i.e., on-ground or in-flight), aircraft flight dynamics, and/or operational status of corresponding aircraft systems or devices may be referred to as aircraft sensors 62. The aircraft sensors 62 may include at least one reverse thrust demand sensor 62a that is configured for detecting whether the thrust control input device 50 is in a position associated with a reverse thrust demand. The reverse thrust demand sensor 62a may for example be a switch that is arranged relative to a lever of the thrust control input device 50 to be in an active state when the lever is in a position associated with a reverse thrust demand and in an inactive state in any other position. In implementations in which the lever can be used to selectively demand forward thrust and reverse thrust, the reverse thrust demand sensor 62a may be in the inactive state when the lever is either in a neutral/idle position or in any position associated with a forward thrust demand. In implementations in which the lever is dedicated to reverse thrust, the reverse thrust demand sensor 62a may be in the inactive state when the lever is in an off position, and in the active state when the lever is in any other position.

Among the sensors 60 are engine sensors 64 that are dedicated to monitoring the engine 10. The engine sensors 64 typically include system reliability sensors 64a, one or more of which may for example be arranged relative to an oil system of the engine 10 to indicate whether the oil pressure supplied by the oil system to hydraulically-operated system(s) of the engine 10 (for example the reverse thrust system 30) is suitable. The engine sensors 64 also typically include performance sensors 64b for monitoring for example rotation speed, pressure and temperature of different engine components. While a given sensor 60 may be dedicated to detecting the aircraft flight status, the aircraft flight status may also be inferred from signals generated by one or more other sensor(s) 60 of the aircraft 1, for example performance sensor(s) 64b. Certain aircraft systems (or components), for example the above-mentioned thrust control input device 50 and/or engine system(s) such as the oil system, may be referred to as trusted systems of the aircraft 1, and the sensors 60 dedicated to monitoring such trusted system(s) may be said to generate so-called operation signal(s) indicative of whether the associated trusted system is operative (i.e., the trusted system is "on" or "active", in some cases meaning that it operates at least at a certain minimum level) or inoperative (i.e., the trusted system is "off" or "inactive", in some cases meaning that it operates below the minimum level). For example, the reverse thrust demand sensor 62a may generate such operation signal(s) indicative of whether it is in the active state (i.e., operative) or in the inactive state (i.e., inoperative). As will be described henceforth, in certain typical aircraft, the availability of the reverse thrust system 30 may in some cases be limited due to such operation signal being indicative of a trusted system being inoperative.

Some reverse-thrust-capable aircraft and/or engines are provided with a control system 40 having a controller, for example the engine controller 44, that is programmed to control the reverse thrust system 30 according to a reverse thrust demand from the thrust control input device 50, but only under certain circumstances. Stated otherwise, a given module of the engine controller 44, referred to henceforth as a control module 44a, is configured to receive an input signal corresponding to a reverse thrust demand and to accordingly issue a reverse thrust instruction suitable for the reverse thrust system 30 to behave according to the reverse thrust demand. However, another module of the engine controller 44, referred to henceforth as a reverse thrust protection module 44b (or simply "protection module" 44b), is configured to issue, provided that at least one predetermined, so-called "protection" condition is met, a protection instruction intended to prevent the production of reverse thrust by the reverse thrust system 30 despite the control module 44a having issued the reverse thrust instruction. In some implementations, when a protection condition is met, the protection module 44b prevents the transmission of the reverse thrust instruction by the control module 44a, intercepts the reverse thrust instruction, and/or otherwise prevents the reverse thrust system 30 to execute the reverse thrust instruction. In some implementations, when a protection condition is met, the protection module 44b activates a locking mechanism 30a of the reverse thrust system 30 that mechanically prevents operation of the reverse thrust system 30 despite the reverse thrust system 30 having received the reverse thrust instruction. When a protection condition is met, the protection module 44b may be said to be in an active state, and absent protection condition(s), the protection module 44b may be said to be in a disabled state.

The protection condition(s) that must be met for the protection module 44b to be in the active state may for example include the reception by the protection module 44b of fault signal(s) indicative of the reverse thrust demand being inadvertent, of the aircraft 1 being in-flight, or of a trusted system being inoperative or malfunctioning (i.e., operation signal(s)), for example the thrust control input device 50 or a system of the engine 10.

The present technology provides, in an aspect, an aircraft 1 having reverse thrust availability despite at least one of the protection condition(s) being met, hence overriding the protection module, at least under certain circumstances. In some embodiments, the protection module 44b is configured for conditionally and/or temporarily rendering its protection functionality ineffective despite a protection condition being met. Stated otherwise, in some embodiments, the protection module 44b is configured, provided that at least one "availability" condition is met, either for issuing availability instruction(s) to the control module 44a, or for bypassing issuance of any protection instruction(s). The availability condition(s) include the protection module 44b receiving, at least indirectly, status signal(s) indicative of the aircraft 1 being on-ground from at least one trusted sensor 60' of the sensors 60 of the aircraft 1. The term "trusted" may refer, at least in some implementations, to the sensor 60' meeting applicable certification requirements as to its reliability in indicating whether the aircraft 1 is on-ground or in-flight. Such trusted sensor(s) 60' may include for example a load sensor or switch operatively connected to a landing gear of the aircraft 1, a GPS onboard the aircraft 1, a non-contact position sensor onboard the aircraft 1, an engine performance sensor of the engine 10 and an avionics sensor of the aircraft 1. The status signal(s) indicative of the aircraft 1 being on-ground may for example be a signal from the load sensor indicating the presence of a weight on wheels, a signal from the switch indicating that the landing gear is deployed, a reading of the GPS stating that the aircraft is at an altitude corresponding to that of the ground at a given geographical location, a reading from the non-contact position sensor indicating that the ground is within a predetermined range, and/or a combination of readings from avionics sensor(s) 62 (for example calibrated airspeed (VCAS) or true airspeed (VTAS), together with ambient pressure (Pamb) or ambient temperature (Tamb) and/or engine sensor(s) 64 (e.g., engine rotation speed, air mass flow rate, etc.) The status signal(s) could otherwise be indicative of the aircraft being in-flight, in which case the protection functionality may be active, i.e., the protection module 44b may be in the active state, at least under certain circumstances.

Although the control module 44a and the protection module 44b are described as distinct modules of the engine controller 44, it should be noted that it is contemplated that in some implementations, they may be provided as a sole module and/or may be a part of the aircraft controller 42.

In some embodiments, the control system 40 includes a so-called reverse thrust preservation module 44c (or simply "preservation module" 44c, FIG. 1) configured to receive the status signal(s) and to override the protection module 44b upon the status signal(s) being indicative of the aircraft 1 being on-ground such that the reverse thrust system 30 is operable according to the input signal. Such overriding by the preservation module 44c can be implemented in several ways. In some such embodiments, the preservation module 44c is coupled to the protection module 44b, and receives the status signal(s) as well as fault signal(s). Upon at least one availability condition being met, should a protection condition be met, the preservation module 44c sends a signal to the protection module 44b indicative of no protection condition being met, thereby effectively masking the occurrence of a protection condition being met. Absent any availability condition being met, should a protection condition be met, the preservation module 44c sends a signal to the protection module 44b indicative of a protection condition being met. In such embodiments, the protection module 44b may be said to receive status signal(s) and fault signal(s) via the preservation module 44c, at least under certain circumstances. In other embodiments, upon at least one availability condition being met, should a protection condition be met, the preservation module 44c issues availability instructions to the control module 44a, thereby bypassing the protection module 44b entirely. Absent any availability condition being met, should a protection condition be met, the preservation module 44c sends a signal to the protection module 44b indicative of a protection condition being met. In some embodiments, the preservation module 44c may be a part of the protection module 44b. In other such embodiments, the preservation module 44c is configured to bypass the protection module 44b upon the status signal(s) being indicative of the aircraft being on-ground, to allow the control module 44a to control the reverse thrust system 30 regardless of the protection module 44b being in the active state or in the disabled state.

Referring now to FIGS. 2-3B, the present technology may be implemented on aircraft 1 having different types of engines. For example, as shown in FIG. 2, the aircraft 1 may be provided with engines 10 of the turboprop 10' type, i.e., an engine 10' that whose thrust system 20 includes a propeller 22. In some such implementations, the propeller 22 may be of the controllable-pitch type. Such propellers 22 include a hub 24 that is rotatable about an axis A of the engine 10', and circumferentially spaced-apart blades 26 that extend radially outward from the hub 24. Each one of the blades 26 has a root 26r that is rotatably connected to the hub 24 so as to be rotatable about a respective axis B that extends generally radially relative to the axis A. A chord line 26c of the blade 26, i.e., a notional line extending from a trailing edge 26t of the blade 26 to a leading edge 26l of the blade 26, defines a position, or "pitch", angle α of the blade 26 relative to an axis C that is orthogonal to the axis A and the axis B. When the position angle α is forward of the axis C (as shown at $\alpha_F$), rotation of the hub 24 about the axis A generates forward thrust. When the position angle α is rearward of the axis C (as shown at $\alpha_R$), rotation of the hub 24 about the axis A generates rearward, i.e., reverse, thrust. As such, in such implementations, the reverse thrust system 30 may be said to be part of the thrust system 20. A forward position angle $\alpha_F$ (or positive pitch angle) of the blades 26 may be referred to as a disabled position of the reverse thrust system 30, whereas a rearward position angle $\alpha_R$ (or negative pitch angle) of the blades 26 may be referred to as an active position of the reverse thrust system 30. A position angle α of the blades 26 at which their respective chord 26c is generally parallel to the axis A, and hence to the direction of flight, for example a forward position angle $\alpha_F$ of about 90 degrees, may be referred to as a feathered position of the blades 26. When the blades 26 are in the feathered position, the propeller 22 may be said to be feathering. In some implementations, the feathered position is a disabled position of the reverse thrust system 30.

In typical turboprop engines implementation absent the present technology, the protection module 44b, when in the active state, causes the propeller 22 to feather, thereby rendering both reverse thrust and forward thrust unavailable. Under such circumstances, when the propeller 22 is feathering during a landing manoeuver, the pilot may neither use reverse thrust to shorten the landing distance of the aircraft 1, nor use forward thrust to reject the landing and climb back up should either need arise. The present technology can thus be said to prevent inadvertent propeller 22 feathering, at least under certain circumstances. Hence, the present technology can be implemented, mutatis mutandis, to preserve reverse thrust availability on various types of aircraft equipped with turbo-prop engine(s) while such aircraft is on-ground. Suitable implementation may vary depending on the type of aircraft. For instance, particular care may be used in implementing and operating the present technology on dual and multi-prop aircraft to mitigate risk of asymmetric thrust occurrences, for example.

Referring to FIGS. 3A and 3B, the aircraft 1 may be provided with engines 10 of a turbofan type 10" provided with a reverse thrust system 30 in the form of a thrust reverser 30, which may for example be of the target or clamshell type as depicted. It should be noted that other types of thrust reversers are contemplated, for example so-called internal thrust reversers that include deflectors located inside the engine shroud to impinge on exhaust flow. In this particular implementation, the reverse thrust system 30 is implemented in an aft section of a nacelle 12 of the engine 10'. The thrust reverser 30 includes pivoting doors 32a, 32b that are pivotable relative to a shroud of the engine 10' between a stowed position 30a (FIG. 3A) and a deployed position 30b (FIG. 3B). The doors 32a, 32b form at least a portion of a propulsive jet outlet 14 of the engine 10' when they are in the stowed position 30a. When in the deployed position 30b, the doors 32a, 32b substantially close the propulsive jet outlet 14 and redirect the exhaust flow in a direction that is generally forward. The stowed position 30a may be referred to as the disabled position of the reverse thrust system 30, whereas the deployed position 30b may be referred to as the active position of the reverse thrust system 30.

In either of the implementations depicted respectively in FIG. 2 and FIGS. 3A, 3B, one of the engine sensors 64 may be arranged relative to the reverse thrust system 30 for determining whether it is in the active position or the disabled position. For example, such a sensor 64 can be arranged for determining whether a thrust reverser is stowed or deployed. Such a sensor 64 can otherwise be provided for determining a rotational position, or angle, of the blades 26 of a propeller 22, and thus determine whether it is a positive pitch angle or a negative pitch angle.

In typical aircraft absent the present technology, the control system 40 is configured such that the protection module 44b can be placed in the active state upon any one of a multitude of protection conditions being met, which may occur during approach and/or landing, and thus cause untimely unavailability of reverse thrust while such aircraft is on-ground. In the past, attempts were made to increase the availability of reverse thrust on such aircraft by way of protection module 44b logic that would determine, upon a particular protection condition being met, whether this particular protection condition should contribute to causing the protection module 44b to be placed in the active state in view of other fault and/or operation signal(s) received by the protection module 44b. Stated otherwise, prior to the present technology, it was assumed that an increase of reverse thrust availability could only be achieved by further processing of fault and/or signal(s) to determine the state in which the protection module 44b should be placed. In such attempts, some risk remained that the protection module 44b would nonetheless cause untimely unavailability of the reverse thrust system 30, at least under certain circumstances. Instead, the present technology proposes to render reverse thrust available upon an availability condition being met, for example a status signal being indicative of the aircraft being on-ground, regardless of the state in which the protection module 44*b* is placed, thus effectively overriding the functionality of the protection module 44*b*, at least as provided in the prior art. As will be apparent to a person skilled in the art, the present technology provides a solution for increased reverse thrust availability that is more reliable and simpler to implement than the previous attempts described hereinabove.

With reference to FIG. 4, in another aspect, the present technology provides a method 100 of operating a reverse thrust system 30 of the engine 10, 10', 10" of an aircraft 1. The reverse thrust system 30 is controllable by the control system 40, that is, via the control module 44*a* subject to the intervention of the protection module 44*b*. The method 100 generally comprises, at step 102, receiving a status signal indicative that the aircraft 1 is on-ground or in-flight via a module of the control system 40, for example the protection module 44*b* described hereinabove. The method 100 also generally comprises, at step 104, upon detecting that the aircraft 1 is on-ground based on the status signal, overriding, for example via the preservation module 44*c* described hereinabove, the protection module 44*b*, thereby causing the reverse thrust system 30 to be operable regardless of the protection module being in the active state or the disabled state.

Alternately, the method 100 of operating the reverse thrust system 30 of the engine 10, 10', 10" of the aircraft 1 may include, when the aircraft has an on-ground status and the protection module 44*b* is in the active state, overriding the active state of the protection module 44*b* to place the protection module 44*b* in the disabled state while the aircraft 1 is moving but on the ground.

In some embodiments, the method 100 further comprises, at step 106, receiving a second status signal indicative of the aircraft 1 being on-ground or in-flight, for example via the protection module 44*b*, the status signal being a first status signal, the protection module 44*b* being in the disabled state upon the first and second status signals being indicative of the aircraft being on-ground, and the protection module 44*b* being in the active state upon at least one of the first and second status signals being indicative of the aircraft 1 being in-flight.

In some embodiments, the method 100 further comprises, at step 108, operating the reverse thrust system 30 by transmitting an input signal from a thrust control input device 50 of the aircraft 1 to the reverse thrust system 30 while the protection module 44*b* is in the active state, for example via the protection module 44*b* or in some cases via the preservation module 40*c* if one is provided.

In some embodiments, the control system module is a first control system module of the aircraft 1, for example the protection module 44*b*, and the overriding includes transmitting the input signal from a thrust control input device 50 of the aircraft 1 to the reverse thrust system 30 via a second control system module of the aircraft 1, for example the preservation module 44*c*

In some embodiments, the method 100 further comprises, at step 110, controlling the reverse thrust system 30 to move from the disabled position to the active position upon receiving the input signal after having received the status signal, with the status signal being indicative that the aircraft 1 is on-ground and the protection module 44*b* being in the active state.

In some embodiments, the method 100 further comprises, at step 112, moving the reverse thrust system 30 from the active position to the disabled position upon receiving the status signal, with the status signal being indicative that the aircraft 1 is in-flight and the protection module being in the active state. In some such embodiments, the moving of the reverse thrust system 30 from the active position to the disabled position under such conditions overrides the input signal when a reverse thrust demand is generated simultaneously. In some embodiments, the method comprises operating the reverse thrust system 30 according to an input signal received from the thrust control input device 50 of the aircraft 1 while the protection module 44*b* is in the active state.

In some embodiments, the engine 10 includes a variable-pitch propeller 22 being part of the reverse thrust system 30, and the active position corresponds to a positive pitch angle of blades 26 of the propeller 22, and the disabled position corresponds to a negative pitch angle of the blades 26. In other embodiments, the reverse thrust system 30 includes a thrust reverser, and the active position corresponds to a deployed position of the thrust reverser and the disabled position corresponds to a stowed position of the thrust reverser.

In some embodiments, the method 100 further comprises, upon detecting that the aircraft 1 is on-ground based on the status signal, deactivating the locking mechanism 30*a* of the reverse thrust system 30. This may prevent hindrance of the reverse thrust system 30 in case of malfunction of the locking mechanism 30*a*. In some embodiments, the method 100 further comprises controlling the locking mechanism 30 to move from a locked position, in which it mechanically hinders operation of the reverse thrust system 30, to an unlocked position, in which operation of the reverse thrust system is unhindered thereby, before deactivating the locking mechanism 30*a*.

In some embodiments, the status signal is received from sensor(s) 60 being one or more of a load sensor operatively connected to a landing gear of the aircraft 1, a GPS onboard the aircraft 1, a non-contact position sensor onboard the aircraft 1, an engine performance sensor of the engine 10 and an avionics sensor of the aircraft 1.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of operating a reverse thrust system of an engine in an aircraft, the method comprising:
   receiving a status signal indicative that the aircraft is on-ground or in-flight; and
   upon detecting that the aircraft is on-ground based on the status signal, overriding a protection module such that the reverse thrust system is operable regardless of the protection module being in an active state or in a disabled state, the protection module causing, absent the overriding, the reverse thrust system to be inoperable when in the active state.

2. The method of claim 1, further comprising placing the protection module in the active state upon detecting that the aircraft is in-flight based on the status signal.

3. The method of claim 2, further comprising receiving a second status signal indicative that the aircraft is on-ground or in-flight, the status signal being a first status signal, and placing the protection module in the disabled state upon detecting that the first and second status signals are indicative of the aircraft being on-ground.

4. The method of claim 2, further comprising receiving a second status signal indicative that the aircraft is on-ground or in-flight, the status signal being a first status signal, and placing the protection module in the active state upon detecting that one or both of the first and second status signals are indicative of the aircraft being in-flight.

5. The method of claim 2, further comprising receiving an operation signal indicative that a trusted system of the aircraft is operative or inoperative, and placing the protection module in the active state upon detecting that the status signal is indicative of the aircraft being in-flight and/or upon detecting that the operation signal is indicative of the trusted system being inoperative.

6. The method of claim 1, further comprising, upon detecting that the aircraft is on-ground based on the status signal, deactivating a locking mechanism of the reverse thrust system.

7. The method of claim 6, further comprising, before deactivating the locking mechanism, controlling the locking mechanism to move from a locked position to an unlocked position.

8. The method of claim 1, further comprising operating the reverse thrust system according to an input signal received from a thrust control input device of the aircraft while the protection module is in the active state.

9. The method of claim 1, further comprising moving the reverse thrust system from an active position to a disabled position upon receiving the status signal, with the status signal being indicative that the aircraft is in-flight and the protection module being in the active state.

10. The method of claim 9, further comprising receiving an input signal from a thrust control input device of the aircraft, wherein moving the reverse thrust system from the active position to the disabled position upon receiving the status signal, with the status signal being indicative that the aircraft is in-flight and the protection module being in the active state, overrides the input signal.

* * * * *